US009206978B2

(12) United States Patent
Evans et al.

(10) Patent No.: US 9,206,978 B2
(45) Date of Patent: Dec. 8, 2015

(54) PRESSURIZED WATER REACTOR COMPACT STEAM GENERATOR

(75) Inventors: Matthew C. Evans, Pittsburgh, PA (US); Alexander W. Harkness, Gibsonia, PA (US); Creed Taylor, Signal Mountain, TN (US); William Edward Cummins, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 913 days.

(21) Appl. No.: 13/495,050

(22) Filed: Jun. 13, 2012

(65) Prior Publication Data

US 2013/0336442 A1    Dec. 19, 2013

(51) Int. Cl.
| | |
|---|---|
| *G21C 3/56* | (2006.01) |
| *F22B 37/32* | (2006.01) |
| *G21C 1/32* | (2006.01) |
| *G21C 15/16* | (2006.01) |
| *G21D 1/00* | (2006.01) |
| *F22B 1/02* | (2006.01) |

(52) U.S. Cl.
CPC ............. *F22B 37/327* (2013.01); *F22B 1/023* (2013.01); *G21C 1/322* (2013.01); *G21C 15/16* (2013.01); *G21D 1/006* (2013.01); *Y02E 30/32* (2013.01)

(58) Field of Classification Search
CPC .......... G21C 1/32; G21C 1/322; G21C 1/324; G21C 1/326; G21C 1/328
USPC .................................. 376/406, 918
See application file for complete search history.

(56) References Cited

U.S. PATENT DOCUMENTS

| | | | |
|---|---|---|---|
| 3,401,082 A | | 9/1968 | Ammon et al. |
| 5,158,742 A | * | 10/1992 | Dillmann ...................... 376/299 |

OTHER PUBLICATIONS

Fetterman, R. et al., "The Westinghouse SMR", Nuclear Engineering International [online], Apr. 20, 2012 (entire document).*
Shulyak, N., "Westinghouse Small Modular Reactor Development Overview", INPRO Dialogue Forum on Nuclear Energy Innovations: Common User Considerations for Small and Medium-sized Nuclear Power Reactors, 3rd. Vienna Austria, Jul. 4, 2011 (entire document).*
Westinghouse AP1000 Design Control Document [online], Revision 19, Jun. 21, 2011.*

(Continued)

*Primary Examiner* — Jack W Keith
*Assistant Examiner* — Marshall O'Connor
(74) *Attorney, Agent, or Firm* — Joseph C. Spadacene; Westinghouse Electric Company LLC

(57) ABSTRACT

A steam generator system for a pressurized water reactor which employs an external to containment steam drum and recirculation loop piping. The steam generator system changes the arrangement of a typical pressurized water reactor recirculation steam generator by relocating the functions of steam separation and feedwater preheating outside of the reactor coolant system. The steam generator system and thermal hydraulic conditions are selected in order to minimize the size of the steam generator heat exchanger component volume inside of the containment. The external steam drum component can be isolated in accident conditions when desired and is used as a source of secondary fluid inventory for improved decay heat removal capability and tolerance for loss of feedwater events. Thus, the steam generator component volume inside of the containment is reduced and the amount of maintenance required for the reactor coolant system components are similarly reduced.

11 Claims, 4 Drawing Sheets

(56) References Cited

OTHER PUBLICATIONS

International Search Report for PCT/US2013/043555 dated Oct. 21, 2013 (Form PCT/ISA/210).

Written Opinion of the International Searching Authority for PCT/US2013/043555 dated Oct. 21, 2013 (Form PCT/ISA/237).

International Preliminary Report on Patentability for PCT/US2013/043555 dated Dec. 24, 2014 (Forms PCT/IB/326, PCT/IB/373, PCT/ISA/237).

* cited by examiner

PRESSURIZED WATER REACTOR COMPACT STEAM GENERATOR

BACKGROUND

1. Field

This invention relates generally to pressurized water nuclear reactors and, more particularly, to steam generators for pressurized water reactors.

2. Description of Related Art

In a nuclear reactor for power generation, such as a pressurized water reactor, heat is generated by fission of a nuclear fuel such as enriched uranium, and transferred into a coolant flowing through a reactor core. The core contains elongated nuclear fuel rods mounted in proximity with one another in a fuel assembly structure, through and over which the coolant flows. The fuel rods are spaced from one another in co-extensive parallel arrays. Some of the neutrons and other atomic particles released during nuclear decay of the fuel atoms in a given fuel rod pass through the spaces between fuel rods and impinge on fissile material in adjacent fuel rods, contributing to the nuclear reaction and to the heat generated by the core.

Moveable control rods are dispersed throughout the nuclear core to enable control of the overall rate of the fission reaction, by absorbing a portion of the neutrons passing between fuel rods, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to fission in an adjacent fuel rod; and retracting the control rods reduces the extent of neutron absorption and increases the rate of the nuclear reaction and the power output of the core.

FIG. 1 shows a simplified conventional nuclear reactor primary system, including a generally cylindrical pressure vessel 10 having a closure head 12 enclosing a nuclear core 14 that supports the fuel rods containing the fissile material. A liquid coolant, such as water, is pumped into the vessel 10 by pump 16 through the core 14 where heat energy is absorbed and is discharged to a heat exchanger 18 typically referred to as a steam generator, in which heat is transferred to a utilization circuit (not shown) such as a steam driven turbine generator or industrial process steam application. A pressurizer 22 is included to maintain the pressure of the system to ensure the coolant does not bulk boil. The reactor coolant is then returned to the pump 16 completing the primary loop. Typically, a plurality of the above described loops are connected to a single reactor vessel 10 by reactor coolant piping 20.

Commercial power plants employing this design are typically on the order of 1,100 megawatts electrical output or more. More recently, Westinghouse Electric Company LLC has proposed a small modular reactor in the 200-300 megawatt class electrical output. The small modular reactor is an integral pressurized water reactor with all primary components located inside the reactor vessel. Required component size and fabrication methods typically make the steam generator one of the larger primary system components; therefore, incorporating the steam generator within the reactor vessel would make the vessel unwieldy, both from a manufacturing standpoint as well as from a service perspective. Thus, there is a need for a new steam generator design that will reduce the size of the steam generator components that would benefit from being housed within the reactor vessel.

Accordingly, a new compact steam generator design is desired that will maintain the efficiencies of traditional pressurized water reactor steam generators with no sacrifice in safety.

Furthermore, a new compact steam generator design is desired that will reduce the overall size of the components that need to be stored within the reactor containment.

SUMMARY

These and other objectives are achieved by a compact steam generator design for a pressurized water nuclear reactor system that includes a reactor pressure vessel housing a nuclear core. The compact steam generator comprises a heat exchanger housed within a first pressure vessel, having a primary and secondary side for respectively isolating a primary fluid medium from a secondary fluid medium while, at least in part, maintaining the secondary fluid medium in heat exchange relationship with the primary fluid medium. The primary side of the heat exchanger is configured to be in fluid communication with the nuclear core. The steam generator also includes a steam drum that comprises a second pressure vessel configured to be in fluid communication with the secondary side of the heat exchanger wherein, in operation, the first pressure vessel is maintained at a higher primary pressure than a secondary pressure of the second pressure vessel.

Preferably, the first pressure vessel is housed within a reactor containment building that houses a primary loop of the pressurized water nuclear reactor system and the secondary pressure vessel is housed outside the reactor containment. More preferably, the first pressure vessel is the reactor pressure vessel that houses the core, the heat exchanger and the primary coolant loop and the primary fluid medium is a reactor coolant. In one embodiment, the steam drum includes the second pressure vessel rated for secondary design pressure, moisture separation equipment housed within the secondary pressure vessel, a feedwater distribution device and flow nozzles respectively for wet steam, feedwater, recirculating liquid and dry steam. The steam drum may also include one or more of a secondary blow down device, a sludge collector and/or a loose parts trap.

The steam drum is desirably connected to the heat exchanger with a recirculation loop that includes a wet steam piping segment connecting a wet steam outlet on the heat exchanger to a wet steam nozzle inlet to the second pressure vessel and a recirculating liquid piping segment connecting a recirculating liquid outlet nozzle on the second pressure vessel with a sub-cooled recirculation input on the heat exchanger. Preferably, the recirculating liquid piping segment includes a recirculation pump. Additionally, the wet steam piping segment and the recirculating liquid piping segment respectively include isolation valves for isolating the heat exchanger from the steam drum and the recirculation loop is rated for the primary pressure between the heat exchanger and the isolation valves and for the secondary pressure between the isolation valves and the steam drum.

In another embodiment, the steam drum is supported at an elevation higher than the heat exchanger to facilitate natural recirculation of the recirculating liquid. Furthermore, in another embodiment, the heat exchanger includes a plurality of heat exchange tubes that extend between one or more tube sheets through which one or more of the primary fluid and the secondary fluid medium flow. Desirably, the primary fluid medium and the secondary fluid medium flow through or about the heat exchange tubes in a countercurrent relationship.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
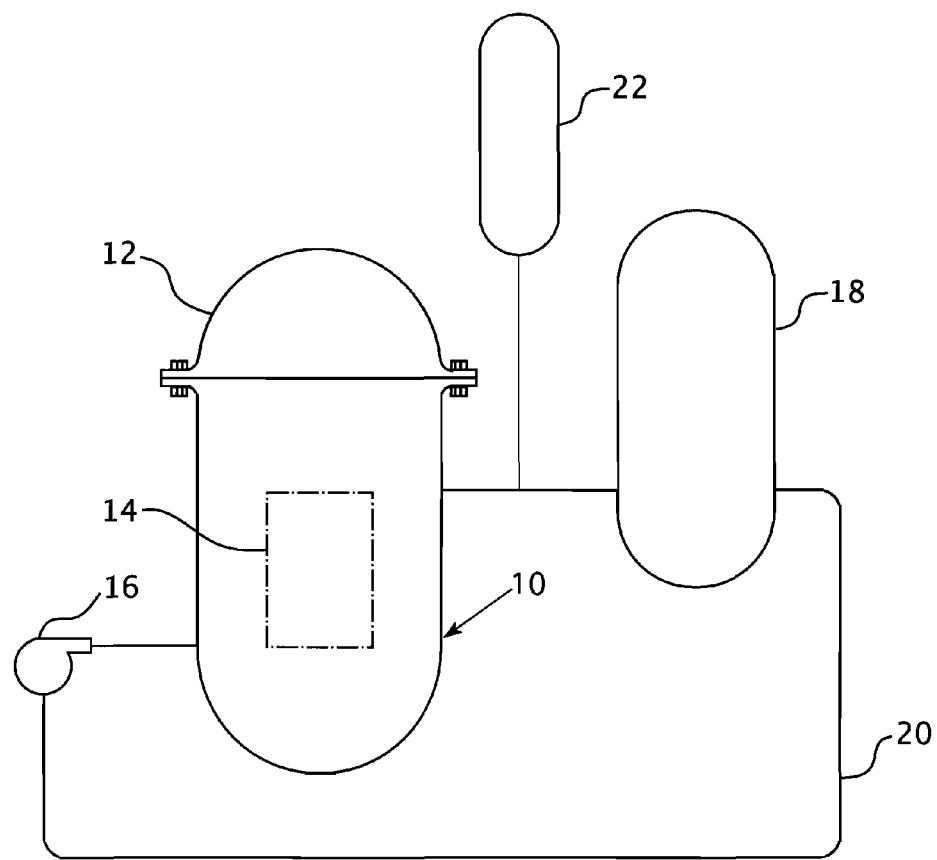
FIG. 1 is a simplified schematic of a nuclear reactor system to which this invention may be applied.
Figure 2:
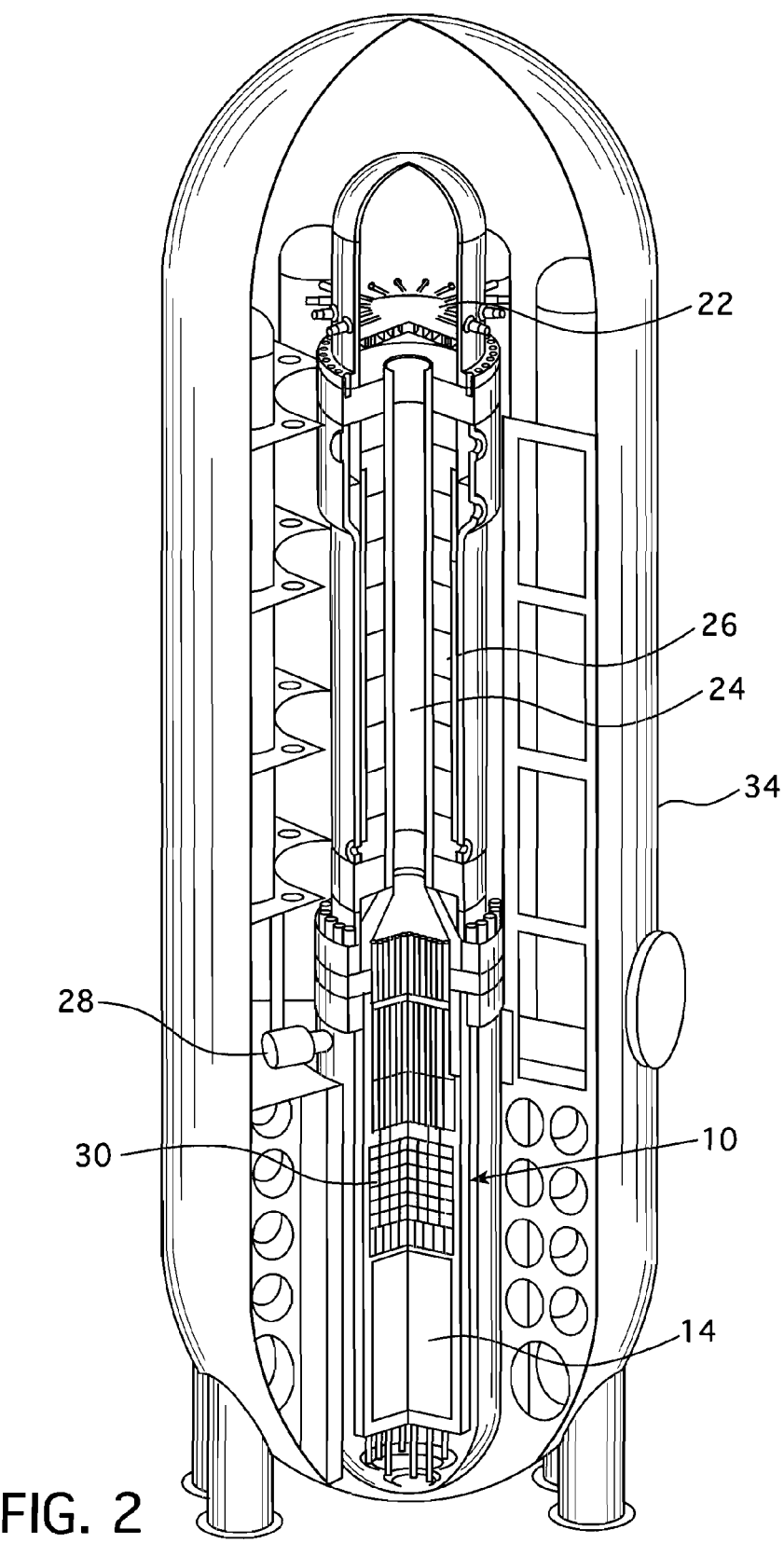
FIG. 2 is a perspective view, partially cut away, showing a small modular integral reactor system which may incorporate the benefit of this invention.
Figure 3:
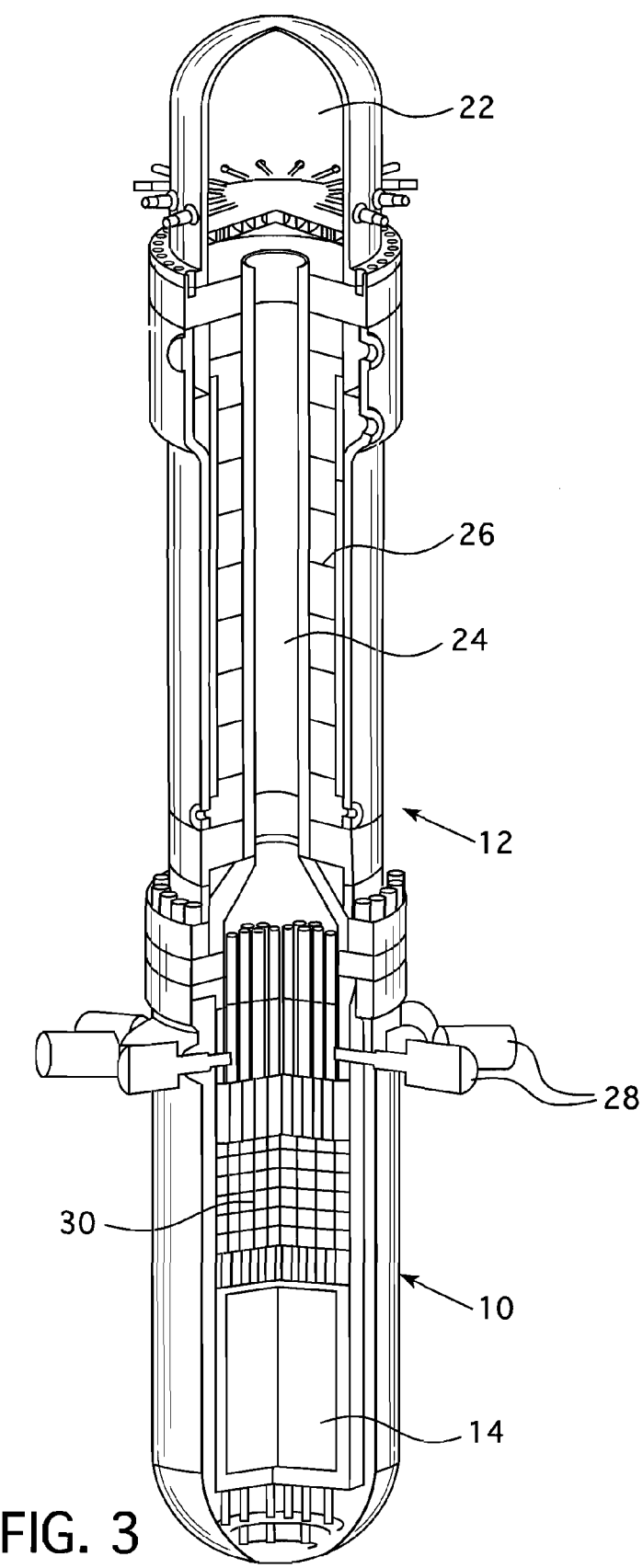
FIG. 3 is an enlarged view of the reactor shown in FIG. 2.
Figure 4:
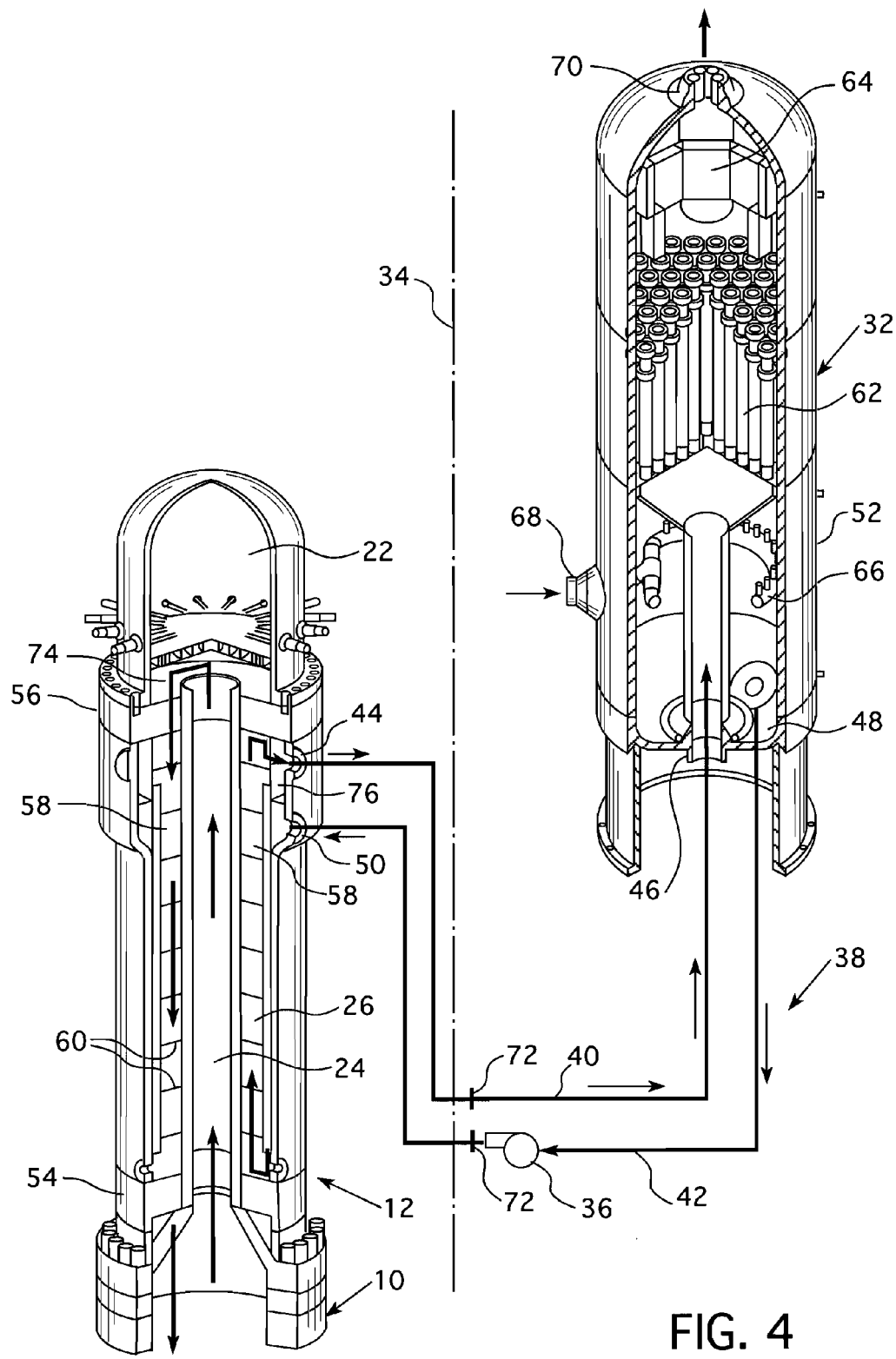
FIG. 4 is a more detailed perspective view of one embodiment of the steam generator of this invention as it may be applied to a modular pressurized water reactor.

The embodiments of the inventions claimed hereafter, illustrated in FIGS. 2-4, describe a steam generator system for a pressurized water nuclear reactor which employs a steam drum and recirculation loop piping external to the reactor containment. The invention changes the arrangement of a typical pressurized water nuclear reactor recirculation steam generator by relocating the functions of steam separation and feedwater preheating outside of the containment. Like reference characters are employed among the several figures to refer to corresponding components. The steam generator system design and thermal hydraulic conditions are selected in order to minimize the size of the steam generator component volume inside the containment. The external steam drum component can be isolated in accident conditions when desired and is used as a source of secondary fluid inventory for improved decay heat removal capability and tolerance for loss of feedwater events. This invention significantly reduces the steam generator component volume inside of the containment and reduces the amount of maintenance required on reactor coolant system components.

Typically, one of two types of steam generators, once-through steam generators and recirculating steam generators, is used in pressurized water reactor systems. Generally, once through steam generators produce superheated steam which require passing through the heat transfer regimes of film boiling and single phase vapor superheating. These heat transfer regimes require additional surface area and steam generator volume inside of the containment. Additionally, once-through designs suffer from a lack of secondary inventory when considering a loss of feedwater transient as the secondary inventory provides a mechanism for decay heat removal. However, this small secondary inventory is a benefit when considering steam line break and feedwater line break mass and energy release to containment accident analyses.

Typically, recirculating steam generators produce dry saturated steam and are designed to operate predominantly within the efficient heat transfer regimes of sub-cooled and nucleate boiling. However, these designs require significant space inside of the containment for moisture separation equipment. The large secondary inventory is a benefit when considering a loss of feedwater transient but a detriment when considering steamline break and feedwater line break mass and energy release to the containment accident analyses.

This invention provides a design for a compact steam generator within the containment and improvements in both loss of feedwater transient, feedwater line break and steamline break mass and energy release to the containment accident analyses. Employing once-through or recirculating steam generators may not be practical in certain reactor designs due to the configuration, space and access requirements such as are found in small modular reactors.

FIGS. 2 and 3 illustrate such a small modular reactor, which can benefit from the compact steam generator design of this invention. FIG. 2 shows a perspective view, partially cut away, to show the containment, reactor vessel and their internals. FIG. 3 is an enlarged view of the reactor vessel shown in FIG. 2. The pressurizer 22 is integrated into the upper portion of the reactor vessel head 12 and eliminates the need for a separate component. A hot leg riser 24 which forms part of the hot leg of the reactor coolant primary loop, directs primary coolant from the core 14 to a heat exchanger 26 which surrounds the hot leg riser 24. A plurality of reactor coolant pumps 28, six to eight in this exemplary embodiment, are circumferentially spaced around the reactor vessel at an elevation near the upper end of the upper internals 30. The reactor coolant pumps are horizontally mounted axial flow canned motor pumps. The reactor core 14 and the upper internals 30, except for their size, are substantially the same as the corresponding components in a conventional AP 1000® reactor, supplied by Westinghouse Electric Company LLC, Pittsburgh, Pa.

FIG. 4 shows a more detailed view of the upper head 12 of the reactor vessel 10 incorporating the heat exchanger 26 and steam drum 32 of one preferred embodiment of this invention as applied to a small modular reactor. In an integral pressurized water reactor such as illustrated in FIGS. 2-4, all of the components typically associated with the primary side of a nuclear steam supply system are contained in a single pressure vessel 10 that is typically housed within a containment 34. The primary components housed within the pressure vessel 10 include the primary side of steam generators, reactor coolant pumps, a pressurizer and the nuclear reactor itself. The steam generator system in accordance with the embodiments described herein includes an integral steam generator heat exchanger 26, an external to containment steam drum 32, a recirculation pump 36 and recirculation piping 38. The recirculation piping 38 comprises a wet steam piping segment 40 connecting a wet steam outlet nozzle 44 of the heat exchanger 26 to a wet steam nozzle inlet 46 on the steam drum pressure vessel 52. The recirculation piping 38 further includes a recirculating liquid piping segment 42 connecting a recirculating liquid outlet nozzle 48 on the steam drum pressure vessel 52 with a sub-cooled recirculation inlet nozzle 50 on the heat exchanger 26. The steam generator heat exchanger 26 includes the pressure vessel 12 rated for primary design pressure shared by the reactor 10 and other integral components, two tube sheets, 54 and 56, hot leg piping 24 (also referred to as the hot leg riser), heat transfer tubes 58 which extend between the lower tube sheet 54 and the upper tube sheet 56, tube supports 60, secondary flow baffles 76 for directing the flow of the secondary fluid medium among the heat transfer tubes 58.

The heat exchanger pressure vessel 12 is maintained within the containment and is separated from the steam drum pressure vessel 52 by the reactor containment wall 34. The external to containment steam drum 32 is comprised of the pressure vessel 52 rated for secondary design pressure, centrifugal-type and chevron-type moisture separation equipment, respectively 62 and 64, a feedwater distribution device 66 and flow nozzles for wet steam 46, feedwater 68, recirculating liquid 48 and dry steam 70. The recirculation pump 36 is located on the recirculating liquid piping segment 42. Additionally, isolation valves are located on the wet steam piping segment 40 and recirculating liquid piping segment 42 within proximity of the heat exchanger wet steam outlet 44 and the sub-cooled recirculation input 50. The recirculation loop piping 38 is rated for primary pressure, i.e., reactor pressure, between the heat exchanger 26 and the isolation valves 72 and for secondary pressure between the isolation valves 72 and the steam drum 32.

The flow of the primary reactor coolant through the heat exchanger 26 in the head 12 of the reactor vessel 10 is shown by the arrows on the left side of FIG. 4 and the flow of recirculating liquid is shown by the arrows on the right side of the heat exchanger 26 of FIG. 4 and connecting the heat exchanger 26 to the steam drum 32. Thus, as shown in FIG. 4, heated reactor coolant exiting the reactor core 14 travels up and through the hot leg riser 24, through the center of the upper tube sheet 56 where it enters a hot side plenum 74 where the heated coolant makes a 180° turn and enters the heat transfer tubes 58 which extend through the upper tube sheet 56. The reactor coolant then travels down through the heat transfer tubes 58 that extend through the tube sheet 56 transferring its heat to the mixture of recirculated liquid and feedwater that is entering the heat exchanger through the sub-cooled recirculation inlet nozzle 50 in a counterflow arrangement. The sub-cooled recirculating liquid and feedwater that enters the heat exchanger 26 through the sub-cooled recirculation inlet nozzle 50 is directed down to the bottom of the heat exchanger by the secondary flow baffles and up and around the heat exchange tubes 58 and turns just below the upper tube sheet 56 into an outlet channel 76 as defined by the secondary flow baffles, where it is funneled to the wet steam outlet nozzle 44. The wet saturated steam is then conveyed by the wet steam piping segment 40 to the steam drum wet steam nozzle inlet 46 where it is conveyed through the centrifugal moisture separators 62 and then serially through the chevron separator 64. The dry steam then exits the steam drum at the steam nozzle 70 where it is conveyed by the secondary piping to a steam turbine generator for the production of useful work. The moisture separated from the steam by the centrifugal separator 62 and the chevron separator 64 drains down through the bottom of the steam drum where it is combined with feedwater entering through the feedwater inlet nozzle 68 which is dispersed by the feedwater nozzles on top of the feedwater distribution device 66. The combined recirculating liquid and feedwater is then conveyed through the recirculation liquid outlet nozzle, through the recirculating liquid piping segment 42 and into the sub-cooled recirculation input nozzle 50 to repeat the cycle.

Thus, in this embodiment, the steam generator heat exchanger 26 is placed above the reactor. In this configuration, primary reactor coolant flow is directed vertically upward through the hot leg piping 24, then turned in the plenum 74 between the steam generator tube sheet 56 and the pressurizer 22 and then directed vertically downward through the inside of the heat transfer tubes 58 where heat is transferred to the secondary fluid in a counterflow arrangement. Secondary flow enters the steam generator heat exchanger shell as sub-cooled liquid and exits as a saturated steam mixture (30-60% quality) where is directed to the steam drum 32 for moisture separation. The moisture separation equipment in the drum is preferably selected and sized to produce dry saturated steam conditions, greater or equal to 99.9% quality, for input to the turbine for power generation. Secondary operating conditions (pressure and quality) are selected to ensure the design will operate predominantly within the efficient nucleate boiling heat transfer regime. For example, the steam drum provides a mixing volume where recirculating liquid preheats the feedwater reducing the sensible heat addition required for onset of nucleate boiling resulting in a more compact design. During normal full power conditions, a secondary fluid recirculation pump 36 is used for head addition to offset piping losses; during lower power conditions, the recirculation pump 36 can be bypassed and steam drum elevation is adequate to ensure natural circulation of the secondary fluid.

Other options for the steam generator heat exchanger component of this embodiment includes various configurations of the heat transfer tubes 58 including, but not limited to primary coolant on the outside of the heat transfer tubes with the recirculating liquid being directed through the tubes, helical coil tubes and U-tubes. The arrangement described herein may also be employed in non-integral pressurized water reactor designs.

Generally, a recirculating steam generation process requires the following functions to be satisfied:
1. Flow of secondary coolant over a heat transfer surface area by either natural or forced circulation.
2. Heat transfer from the primary coolant (i.e., the reactor coolant) to the secondary coolant. This heat transfer results in the formation of a low quality saturated-mixture flow.
3. Separation of steam from the saturated mixture through the use of various techniques including: centrifugal-type, chevron-type and gravity steam separation techniques.
4. Feedwater preheating/mixing with the saturated liquid recirculation flow from the steam separators.

The invention changes the arrangement of a typical pressurized water reactor steam generator by removing the functions of steam separation and feedwater preheating and relocating them outside the reactor coolant system. This change is possible since the small integrated modular reactor requires a smaller recirculating water flow when compared to traditional, large, pressurized water reactor installations that use integral steam generators. As a result of this change, the space requirements within the integral reactor coolant system are significantly reduced.

During normal plant operation, the plant power generating systems are in operation using the main steam outlet flow from the steam drum. Continued steam drum operation is supported by the injection of feedwater, which offsets the mass lost to steam flow and also sub-cools the saturated liquid draining from the steam separation equipment. Feedwater sub-cooling of the saturated liquid and elevation head as provided by the liquid column in the steam drum is required as they provide the required net positive suction head to the recirculation pump to prevent pump cavitation. This mixing also reduces the sensible heat addition required for boiling of the secondary fluid in the steam generator heat exchanger.

The recirculation pump provides continuous forced circulation of secondary coolant through the shell side of the steam generator. Heat transfer from the primary coolant via the steam generator heat exchanger provides for sensible and latent heat increases in the secondary fluid, resulting in a two-phase saturated mixture flow at the steam generator heat exchanger outlet 44. The quality of this flow is a function of steam generator surface area, recirculation pump flow rate and reactor power.

In the event of a loss of feedwater, the reactor will be tripped as a protective measure. The use of the steam drum will provide a large thermal mass for the removal of residual heat using either forced circulation (if available) or natural circulation through the steam generator heat exchanger. Similar to current pressurized water reactor design principles, heat removal through the steam dump to the condenser or atmosphere is acceptable since the secondary coolant is not normally contaminated.

In the event of a steam generator tube rupture/collapse event, the secondary fluid cooling loop 38 will be isolated using the isolation valves 72. Since the steam generator heat exchanger and the piping inside the containment envelope 34 has the same design pressure as the reactor vessel 10, overpressure protection is provided by the reactor coolant system. Residual heat would ultimately be removed by the passive plant safety systems.

Thus, this arrangement increases the heat transfer capability through the steam generator by maximizing the overall heat transfer coefficient and logarithmic-mean temperature difference.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A steam generator for a pressurized water nuclear reactor system including a reactor pressure vessel housing a nuclear core, the steam generator comprising:
   a heat exchanger housed within a first pressure vessel, having a primary and secondary side for respectively isolating a primary fluid medium from a secondary fluid medium while, at least in part, maintaining the secondary fluid medium in a heat exchange relationship with the primary fluid medium, the primary side configured to be in fluid communication with the nuclear core; and
   a steam drum including a second pressure vessel configured to be in fluid communication with the secondary side of the heat exchanger wherein in operation the first pressure vessel is maintained at a higher primary pressure than a secondary pressure of the second pressure vessel.

2. The steam generator of claim 1 wherein the first pressure vessel is housed within a reactor containment that houses a primary coolant loop of the pressurized water nuclear reactor system and the second pressure vessel is housed outside the reactor containment.

3. The steam generator of claim 2 wherein the first pressure vessel is the reactor pressure vessel that houses the core, the heat exchanger and a primary coolant loop and the primary fluid medium is a reactor coolant.

4. The steam generator of claim 1 wherein the steam drum includes the second pressure vessel rated for secondary design pressure, moisture separation equipment housed within the second pressure vessel, a feedwater distribution device and flow nozzles respectively for wet steam, feedwater, recirculating liquid and dry steam.

5. The steam generator of claim 4 wherein the steam drum includes one or more of a secondary blowdown device, a sludge collector and a loose parts trap.

6. The steam generator of claim 1 wherein the steam drum is connected to the heat exchanger with a recirculation loop comprising a wet steam piping segment connecting a wet steam outlet of the heat exchanger to a wet steam nozzle inlet to the second pressure vessel, a recirculating liquid piping segment connecting a recirculating liquid outlet nozzle on the second pressure vessel with a sub-cooled recirculation input on the heat exchanger.

7. The steam generator of claim 6 wherein the recirculating liquid piping includes a recirculation pump.

8. The steam generator of claim 6 wherein the wet steam piping segment and the recirculating liquid piping segment respectively include isolation valves for isolating the heat exchanger from the steam drum and the recirculation loop is rated for the primary pressure between the heat exchanger and the isolation valves and for the secondary pressure between the isolation valves and the steam drum.

9. The steam generator of claim 1 wherein the steam drum is supported at a higher elevation than the heat exchanger.

10. The steam generator of claim 1 wherein the heat exchanger includes a plurality of heat exchange tubes and a hot leg that extend between one or more tube sheets through which one or more of the primary fluid and the secondary fluid medium flow.

11. The steam generator of claim 10 wherein the primary fluid medium and the secondary fluid medium flow in a countercurrent relationship.

* * * * *